United States Patent [19]
Ishikawa et al.

[11] 3,927,986
[45] Dec. 23, 1975

[54] APPARATUS FOR INCINERATING A PLASTIC WASTE

[75] Inventors: Toshikatsu Ishikawa, Tokyo; Tei Endo, Yokohama; Toshio Masuyama, Yokohama; Fumio Uruma, Yokohama; Masutaka Morishita, Yokohama; Takeshi Kuki, Tokyo, all of Japan

[73] Assignee: Nippon Carbon Co. Ltd., Tokyo, Japan

[22] Filed: Mar. 7, 1973

[21] Appl. No.: 339,018

[30] Foreign Application Priority Data
Mar. 9, 1972 Japan.................. 47-27947
Mar. 21, 1972 Japan.................. 47-28260
Oct. 19, 1972 Japan.................. 47-104633

[52] U.S. Cl................ 23/277 R; 23/253 A; 23/262; 48/111; 48/209; 55/228; 110/8 R; 159/DIG. 16; 201/25; 261/3; 261/7; 261/17; 261/22; 261/151; 261/DIG. 9; 261/DIG. 54
[51] Int. Cl.².................... B01J 1/00; F23G 7/00
[58] Field of Search ...... 23/277 C, 261, 262; 261/3, 261/7, 17, 22, 151, DIG. 9, DIG. 54; 55/228; 110/8 R, 8 A, 8 B, 8 C, 14, 15; 48/111, 209; 159/DIG. 16; 201/25

[56] References Cited
UNITED STATES PATENTS

| | | | |
|---|---|---|---|
| 1,034,266 | 7/1912 | Matthews.................. | 110/23 X |
| 1,749,839 | 3/1930 | Noel.................. | 110/75 C |
| 2,067,043 | 1/1937 | Caldwell.................. | 159/DIG. 16 |
| 2,669,199 | 2/1954 | Remore.................. | 110/18 R |
| 3,269,340 | 8/1966 | Crawford et al.................. | 110/8 A |
| 3,404,512 | 10/1968 | Tomany.................. | 261/22 X |
| 3,486,307 | 12/1969 | McDermott.................. | 261/22 X |
| 3,495,945 | 2/1970 | Allison et al.................. | 55/228 X |
| 3,635,000 | 1/1972 | Brown.................. | 55/228 X |
| 3,712,796 | 1/1973 | Sansom et al.................. | 23/277 C |
| 3,716,339 | 2/1973 | Shigaki et al.................. | 23/277 C X |
| 3,749,031 | 7/1973 | Burden, Jr.................. | 110/8 R |
| 3,829,558 | 8/1974 | Banks et al.................. | 201/25 X |
| 3,843,339 | 10/1974 | Saito.................. | 201/25 X |

FOREIGN PATENTS OR APPLICATIONS
14,920  6/1911  United Kingdom.................. 110/23

*Primary Examiner*—Morris O. Wolk
*Assistant Examiner*—Roger F. Phillips
*Attorney, Agent, or Firm*—Woodhams, Blanchard and Flynn

[57] ABSTRACT

Plastic waste is incinerated employing air mixed at a proper ratio with combustion exhaust gas from which detrimental components have been removed. Metallic components in the plastic waste do not sublimate nor volatilize and the incinerator is not damaged. Grating divides the incinerator into upper and lower portions. Dispersing tubes for combustion gas are provided on the grating so as to substantially completely incinerate the plastic waste. A vacuum evaporator which utilizes the heat of the combustion gas of the plastic waste is provided for evaporating hydrogen chloride from the absorbing solution.

9 Claims, 9 Drawing Figures

APPARATUS FOR INCINERATING A PLASTIC WASTE

FIELD OF THE INVENTION

This invention relates to an apparatus for incinerating plastic waste.

BACKGROUND OF THE INVENTION

Recently, as the demand for plastic has increased, the amount of plastic waste has also increased. Plastic products are superior in anticorrosion property which is an advantageous property during use of the products, but this property becomes a disadvantage when the plastic products are thrown away. Therefore, plastic wastes are destroyed by an incinerating method.

Many plastic products mainly contain organic chlorine compounds such as vinylchloride, vinylidene chloride, etc. When these plastic wastes are incinerated, the gaseous products of combustion contain hydrogen chloride. The incinerator is operated at a temperature higher than 1000°C. in order to effect complete combustion of the plastic waste, and accordingly the incinerator tends to be substantially damaged. The plastic products also contain detrimental metallic components employed as plasticizers or stabilizers when the plastic products are manufactured, and therefore when the plastic wastes are incinerated, the metallic components of the plasticizer and stabilizer contained in the plastic products are vaporized, and are discharged into the atmosphere, and accordingly an air pollution problem occurs.

As aforementioned, there are no provisions in conventional plastic waste incinerators for retrieval of the metallic components contained in the plastic waste and for preventing corrosion of the incinerator by the corrosive, high temperature gas.

The heat energy of the corrosive gas discharged from the incinerator is not utilized at all.

SUMMARY OF THE INVENTION

An object of this invention is to provide an apparatus for incinerating plastic waste which reduces corrosion of the wall of the incinerator during use, which recovers the metallic components and hydrogen chloride in the plastic waste, and which reduces pollution.

Another object of this invention is to provide an apparatus for incinerating plastic waste which substantially completely incinerates the waste, and which can effectively utilize the combustion heat produced when the plastic waste is incinerated.

This invention has been devised based on the discovery that when solid plastic waste containing chlorinated organic compounds is incinerated at a temperature lower than 800°C., most of the metallic components such as cadmium, zinc, etc. contained in the plastic waste remain in the ash produced by the incineration thereof and that since the incinerator is operated at a relatively lower temperature, it is not substantially damaged by hydrogen chloride gas.

BRIEF DESCRIPTION OF DRAWINGS

These and other objects, features and advantages of the present invention will become fully apparent from the following description taken in conjunction with the accompanying drawings, in which.

DETAILED DESCRIPTION OF THE PREFERRED EMBODIMENTS

Figure 1:
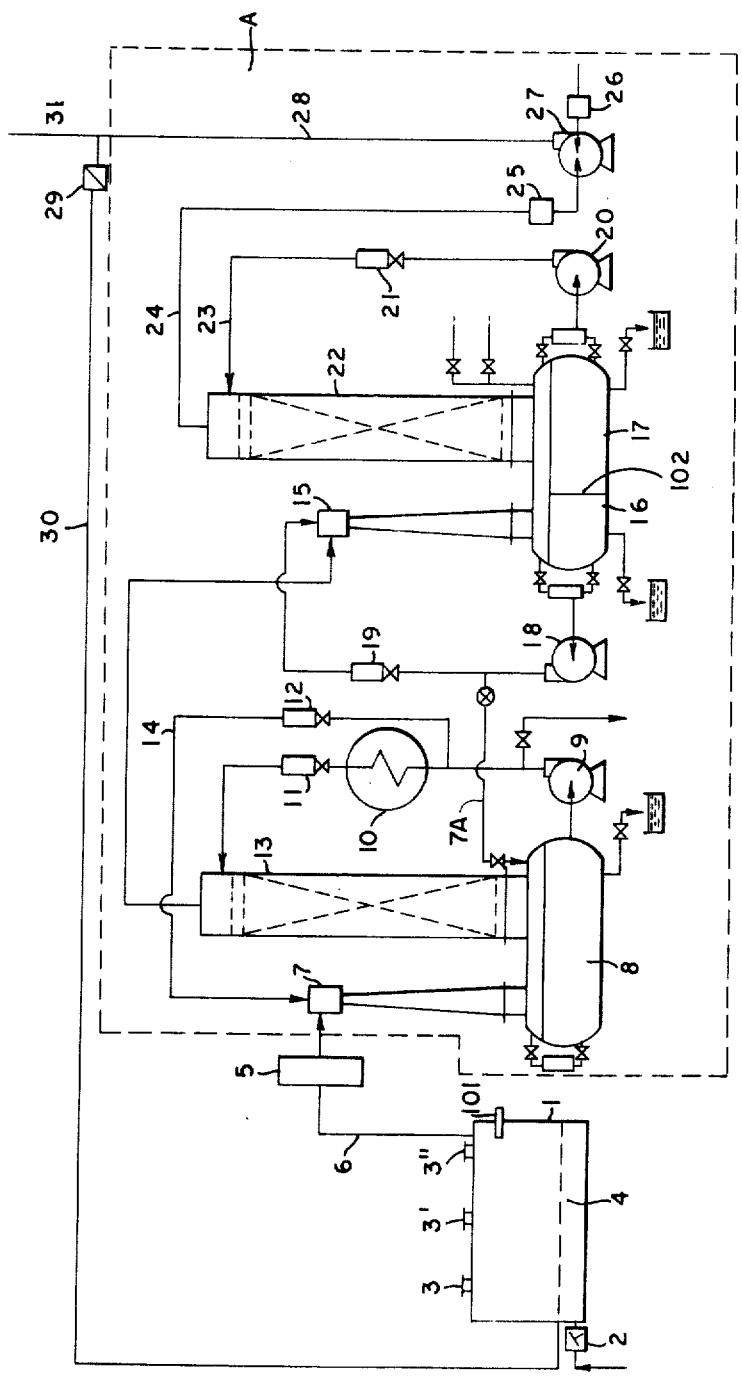
FIG. 1 is a schematic view of an apparatus for incinerating plastic waste constructed according to one embodiment of the present invention.

In FIG. 1, numeral 1 indicates an incinerator and 2 is a damper for controlling flow of air required for incinerating plastic waste. Numerals 3, 3' and 3'' indicates inlets for feeding plastic waste into the incinerator 1, 4 is a grating and 5 is an auxiliary furnace which completely burns unburned components in the exhaust gas by an afterburner provided therein. Numeral 6 indicates an exhaust gas duct connected between the incinerator 1 and the auxiliary furnace 5. A detrimental components removing device is indicated by A, wherein 7 is a jet scrubber, 8 is a reservoir tank, 9 is a circulating liquid feed pump, 10 is a circulating liquid cooler and 11 and 12 are flowmeters. 13 is a hydrochloric acid absorbing tower (packed tower type), in which packing rings are filled. The exhaust gas cooled and washed by the jet scrubber 7 thereafter passes through the tank 8 and rises from the bottom of the tower 13 so that the detrimental components, mainly hydrogen chloride, contained in the exhaust gas are absorbed by the down flowing circulating liquid sprayed into the top of the tower 13.

The hydrogen chloride contained in the exhaust combustion gas is absorbed by the circulating liquid to become concentrated hydrochloric acid solution, and flows into the reservoir tank 8, and is then stored therein. When the concentration of the hydrochloric acid in the circulating liquid in the reservoir tank 8 reaches a predetermined value, the liquid is discharged out of the apparatus. Dilute hydrochloric acid solution which has been used in the jet scrubber 15 is fed into the reservoir tank 8 from chamber 16 through a pipe 7A.

If hydrogen chloride is still contained in the exhaust gas discharged from the first absorbing tower 13, it is recovered in a second absorbing tower 22 constructed similarly to the first absorbing tower 13 and the equipment attached thereto.

Numeral 15 indicates a jet scrubber, 16 an absorbing liquid reservoir chamber, 17 a reservoir chamber for the circulating liquid for the second absorbing tower 22, 18 a feed pump for the circulating liquid of the jet scrubber 15, 19 a flowmeter, 20 a feed pump for the circulating liquid of the second absorbing tower 22, 21 a flowmeter, and 23 a feed pipe for the circulating liquid of the second absorbing tower 22.

In the second absorbing tower 22 there may be adopted a method of completely neutralizing the hydrogen chloride contained in the exhaust gas by circulating alkaline aqueous solution if necessary in this case. As shown in the drawing, if there is provided a partition wall 102 which is higher than the liquid level in the reservoir chamber 16 and 17 gas is allowed to flow to the upper part so as to divide the tank interior into two chambers 16 and 17, a small amount of hydrogen chloride contained in the exhaust gas introduced from the first absorbing tower 13 through the scrubber 15 may be efficiently treated by absorption at the front chamber 16 and by neutralization in the rear chamber 17.

Numeral 24 indicates an exahust gas duct from the second absorbing tower 22, 25 and 26 are dampers, and 27 is a blower. The flow rate of the exhaust gas is adjusted at the damper 25, the incoming air flow rate is adjusted at the damper 26, and the exhaust gas and the air are properly mixed, and are discharged through the duct 28.

Numeral 29 indicates a damper, and 30 is a duct. Flow of dilute exhaust gas diluted with air is controlled by the damper 29, so as to be partially recirculated into the incinerator 1. The remainder is discharged into the atmosphere.

It is preferable that when polyvinyl chloride waste is incinerated in the incinerator 1, the temperature of the furnace is maintained at less than 800°C., particularly at 650° to 550°C., whereby the metallic components contained in the waste are not volatilized.

In order to keep the temperature of the furnace in this temperature range, the temperature of the incinerator 1 is detected by a thermometer 101 so as to automatically adjust the dampers 2 and 29.

It should be understood from the foregoing description that since the metallic components contained in the plastic waste are retained in the ashes remaining under the grating 4 of the incinerator when the plastic waste is incinerated by the apparatus of the present invention and the hydrogen chloride produced when the plastic products are incinerated is substantially completely removed or neutralized, the ambient atmosphere is not polluted.

Figure 2:
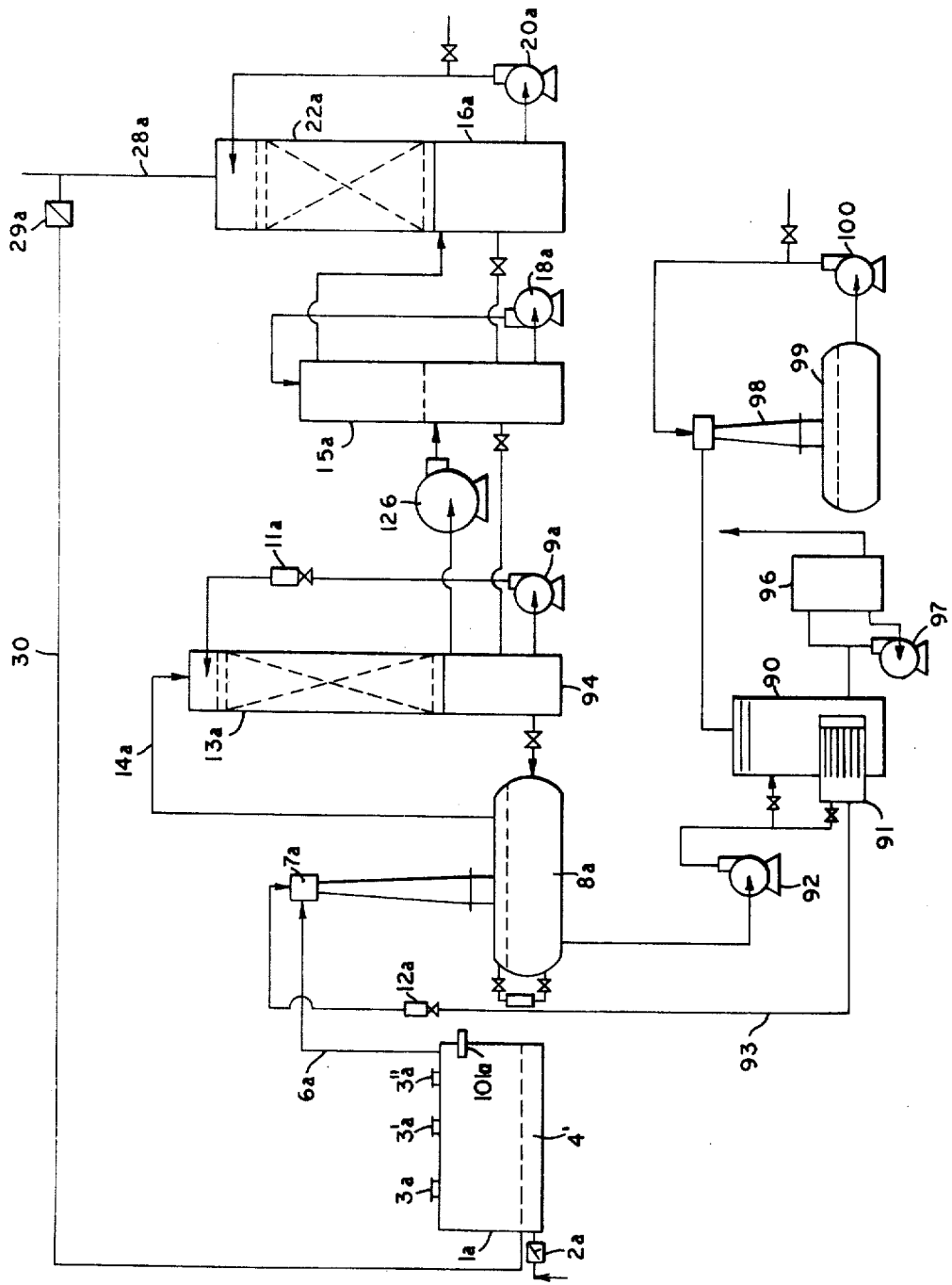
FIG. 2 is a schematic view of another embodiment of apparatus for incinerating plastic waste constructed according to the present invention.
Figure 3:
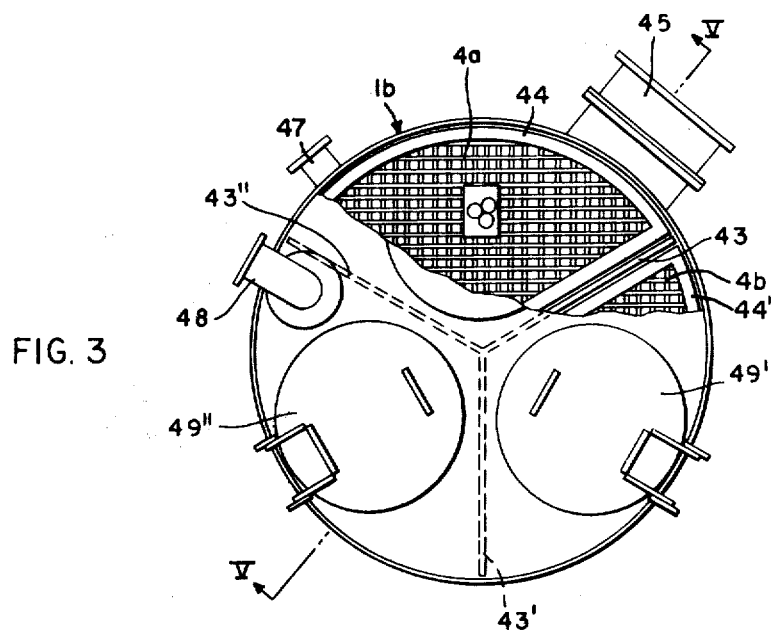
FIG. 3 is a partially broken away, top view of an incinerator of one embodiment of the invention used for incinerating plastic waste.
Figure 5:
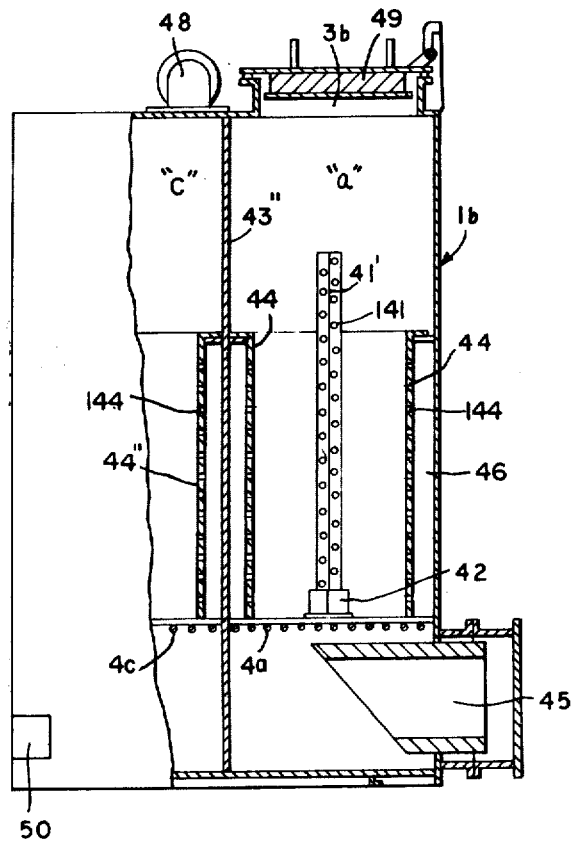
FIG. 5 is a partial vertical sectional view taken along line V—V in FIG. 3.
Figure 4:
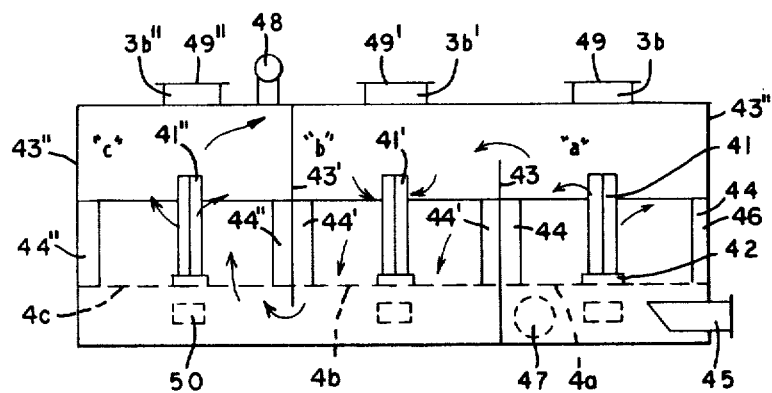
FIG. 4 is a development figure of the incinerator of FIG. 3.
Figure 6:
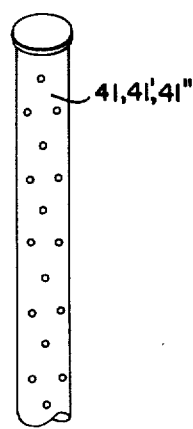
FIG. 6 is a perspective view of a dispersing tube used for an incinerator.

Referring now to FIG. 2 another embodiment of the apparatus of the present invention is exemplified.

Numeral 1a indicates an incinerator, 2a is a damper for air, 3a, 3'a, 3''a respectively indicate inlets for feeding the plastic waste into the incinerator 1a, 4a is a grating, and 6a indicates an exhaust gas duct connected between the incinerator 1a and a jet scrubber 7a.

Numeral 8a indicates a reservoir tank, 9a a circulating liquid feed pump, 11a and 12a flowmeters, 13a the first hydrochloric acid absorbing tower, 94 a reservoir tank for the circulating liquid, and 126 a fan, by which an exhaust gas from the incinerator 1a is sucked through the jet scrubber 7a, the reservoir tank 8a, downwardly through the first absorbing tower 13a and subsequently is discharged into the atmosphere via the reservoir tank 15a and the second absorbing tower 22a.

Numeral 16a indicates an absorbing liquid reservoir tank, 20a is a feed pump for the circulating liquid of the second absorbing tower 22a, 28a is a duct for exhaust gas, 29a is a damper and 30a is a duct, through which a part of the dilute exhaust gas is introduced into the incinerator 1a so as to mix with the air supplied through damper 2a and thereby form an oxidizing gas for controlling the burning of the plastic waste.

Numeral 90 indicates a vacuum evaporator, 92 a pump for feeding the circulating liquid from the tank 8a into the vacuum evaporator 90 and the acid proof heat exchanger 91.

Numeral 93 indicates a duct for the circulating liquid discharged from the acid proof heat exchanger.

The exhaust gas discharged from the incinerator is at a high temperature, and the heat of the exhaust gas is transferred to the circulating liquid contacted with the exhaust gas in the jet scrubber 7a. The circulating liquid is partially fed into the acid proof heat exchanger 91 and partially into the vacuum evaporator 90 by the feed pump 92, and the evaporator is reduced in pressure by the operation of the jet ejector 98, and the circulating liquid is vaporized in the evaporator by the heat exchange of the heat of the circulating liquid by the heat exchanger 91, and the vapor is absorbed with the circulating liquid circulated by the jet ejector 98 to become concentrated hydrochloric acid solution.

The concentrated hydrochloric acid solution thus obtained is taken out at proper times, or in small increments, and water or dilute hydrochloric acid solution is newly fed into the apparatus.

Numeral 93 indicates a feed pipe for the circulating liquid discharged from the heat exchanger 91, 98 a jet ejector, 99 a circulating liquid reservoir tank, and 100 is a circulating liquid feed pump.

The above description refers to the retrieval of the hydrochloric acid, but if retrieval of the hydrochloric acid is not required, the circulating liquid reservoir 99 is filled with aqueous alkaline solution, and the hydrogen chloride is neutralized thereby, and is discharged out of the apparatus.

When the metallic components contained in the exhaust gas from the incinerator 1a become concentrated in the vacuum evaporator 90, the bottom liquid is discharged, and the pH thereof is adjusted so as to precipitate the metallic components, which are filtered by a filter 96, and the filtrate is discharged out of the apparatus, as by a pump 97. Alternately when the distillate from the vacuum evaporator 90 is neutralized and filtered, the filtrate may be sucked by the jet ejector 98 and fed into the circulating liquid reservoir tank for discharge.

According to this embodiment, the incinerator is not damaged, the detrimental metallic components are less volatilized, and concentrated hydrochloric acid solution can be obtained by utilizing the combustion heat of the plastic waste.

Referring now to FIGS. 3 to 6, another embodiment of an incinerator according to this invention is exemplified, which incinerator can be used in place of the incinerator 1 or 1a of FIGS. 1 and 2, respectively.

Figure 7:
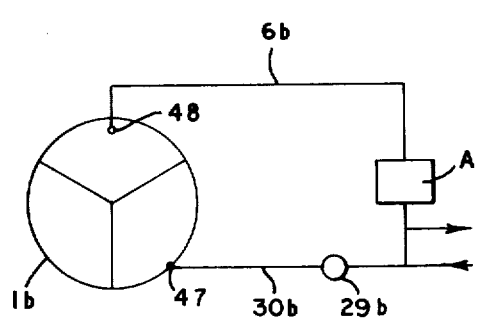
FIG. 7 is a diagram of a system for incinerating plastic waste.

Numeral 1b indicates an incinerator, and 4a, 4b and 4c a grating which has a number of gaps. 41, 41' and 41'' indicate combustion gas dispersing tubes which have a number of holes 141 provided at their side surfaces, and the upper ends of which are closed. Dispersing tubes 41, 41' and 41'' are engaged with communication holes extending through fixing members 42 which are fixed onto the grating 4a, 4b and 4c. Numerals 43, 43' and 43'' indicate vertical partition walls which intersect at angles of 120° with each other for dividing the incinerator 1b into three chambers a, b and c. Inlets 3b, 3b' and 3b'' permit plastic waste to be deposited into the three chambers. Numerals 44, 44' and 44″ indicate dispersing members which extend along the partition walls and along the inner periphery of the incinerator 1b, and 46 are spaces formed between the inner peripheral wall of the incinerator or the partition wall and the dispersing members. The dispersing members 44, 44′ and 44″ have a number of holes 144 therein for providing communication with the chambers a, b and c. Numeral 45 indicates a burner for burning fuel until the plastic waste self-burns so as to raise the temperature of the incinerator 1b. When the temperature of the incinerator becomes high and the plastic waste begins to self-burn, the combustion of the fuel by the burner is stopped. Numeral 47 indicates an inlet for an oxidizing gas, which oxidizing gas is a mixture of air and of combustion gas from the plastic waste after removal therefrom of detrimental components. The inlet 47 is connected through duct 30b and damper 29b to a detrimental components removing device A for hydrogen chloride, cadmium, etc., and device A is in turn connected through duct 6b to the exhaust gas outlet 48 associated with the incinerator. The inlet 47 receives the combustion gas mixed with a proper amount of air. The oxidizing gas is supplied through inlet 47 into the lower part of chamber a, which gas is then fed from the lower part of the chamber a of the incinerator 1b under the grating 4a into the dispersing member 44 and tube 41. The gas is then fed from the side peripheries of the dispersing tube 41 and member 44 through the respective openings 141 and 144 into the upper part of chamber a, whereupon the plastic waste in chamber a is burned at uniform temperature. Some gas is also fed upwardly through the grating 4a. The combustion gas and oxidizing gas are then fed over the partition 43 into the chamber b as illustrated by arrows in the drawings, whereupon the plastic waste is burned little-by-little and the gas fed from the chamber a into the chamber b burns the plastic waste in the chamber b. The gas then flows downwardly through the dispersion tube 41′ and dispersion member 44′ and/or through the grate 4b whereby the gases then flow under the partition 43′ so as to enter the lower part of the chamber c. The gases then flow upwardly through the dispersion tube 41″ and dispersion member 44″ and/or through the grate 4c into the upper part of the chamber c. The gas which is supplied to the chamber c, in combination with the gases generated during combustion of the plastic waste, then flow out the exhaust gas outlet 48 and are supplied through the exhaust gas duct 6b (FIG. 7) to the device A.

The exhaust gas duct 6b is connected to the detrimental components removing device A. Numeral 48 indicates an outlet for the exhaust gas, 3b, 3b′ and 3b″ are inlets for the plastic waste, 49, 49′ and 49″ are openable covers, and 50 an outlet for ashes.

In order to incinerate the plastic waste, the covers 49, 49′ and 49″ of the incinerator 1b are opened, the plastic waste is put into the incinerator 1b through the inlets 3b, 3b′ and 3b″, and then the covers are closed, and fuel is burned by the burner 45 so as to raise the temperature of the incinerator 1b. When the temperature of the incinerator 1b is raised so that the plastic waste begins to self-burn, the combustion of the fuel by the burner is stopped, and the oxygen content of oxidizing gas from the inlet 47 is preferably adjusted to maintain the temperature lower than 800°C, and preferably 650° to 550° C, so that the metallic components contained in the plastic waste do not sublimate nor volatilize.

Figure 8:
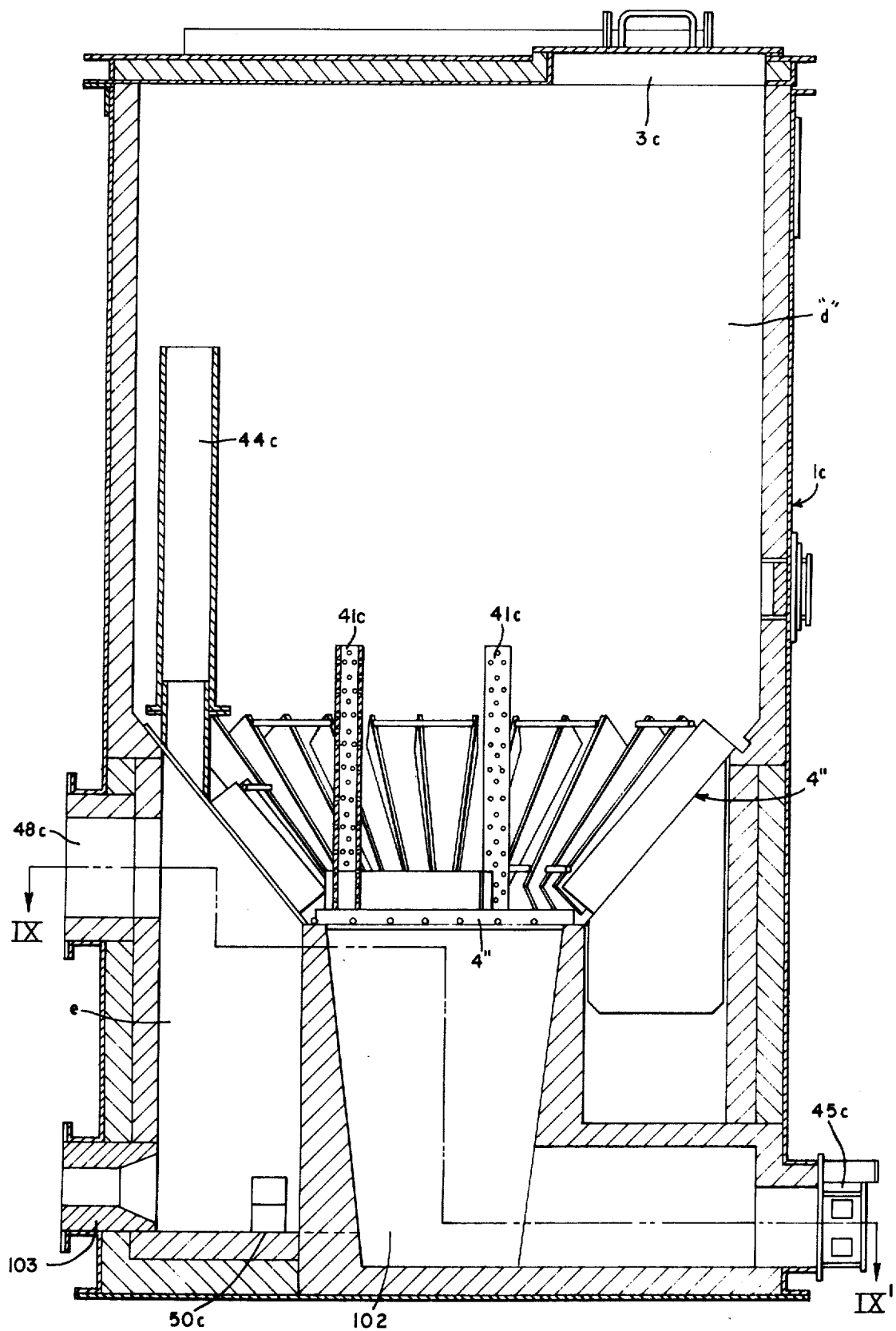
FIG. 8 is a central vertical sectional view of an incinerator of another embodiment.
Figure 9:
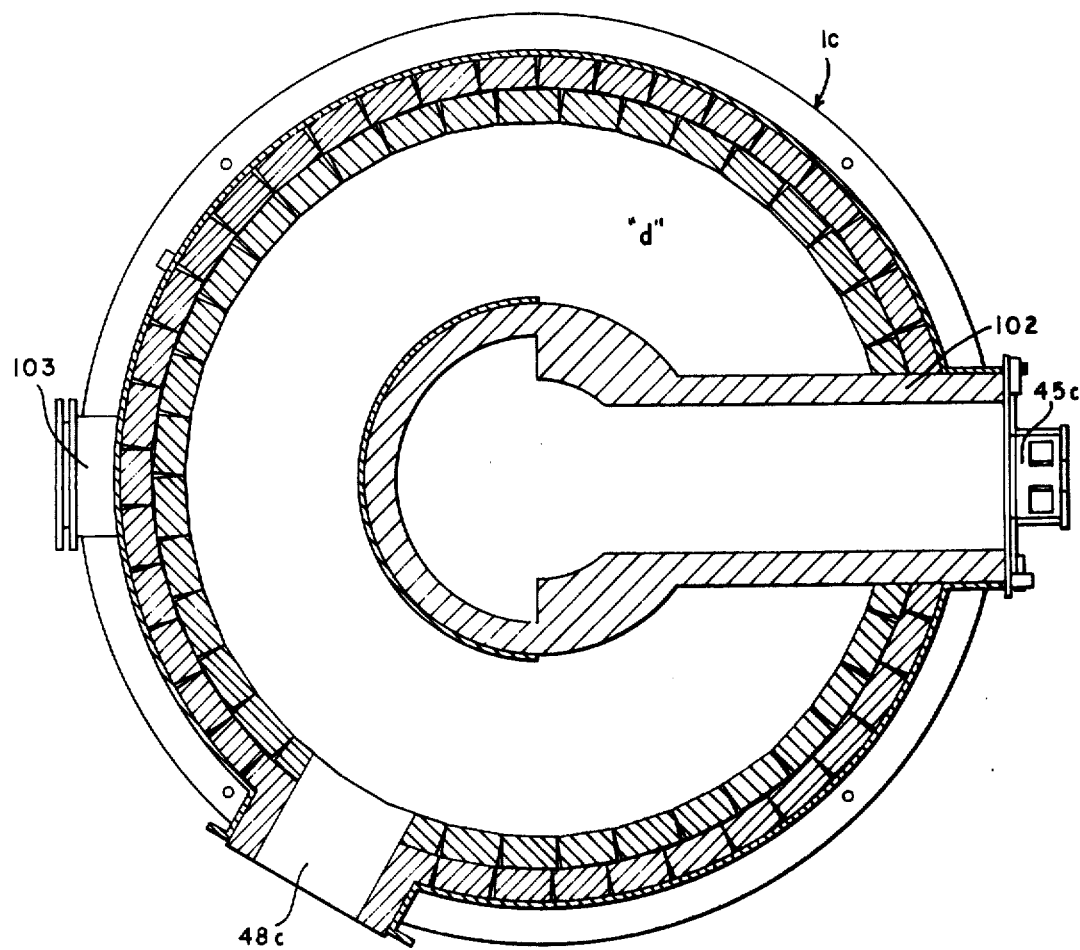
FIG. 9 is a sectional view taken along line IX-IX' of FIG. 8.

Referring to FIG. 8 and FIG. 9, numeral 1c indicates a further incinerator which may be substituted for the above-described incinerators and which is formed of a cylindrical steel case lined with acid-proof refractory bodies and having a grating 4″ of frustoconical shape. Numeral 41c indicates a dispersing tube, 45c is a burner, and 102 is a flue for the burner 45c. The grating 4″ of frustoconical shape is located at the center of the incinerator, the top thereof being fixed to the inner periphery of the incinerator and the bottom thereof being fixed to the upper end of the flue 102 as provided at the center of the incinerator.

Numeral 44c represents a dispensing cylinder and 48c an outlet for exhaust gas from the incinerator. 3c is an inlet for the plastic waste incinerator and 50c is an outlet for ashes.

The dispensing tube 41c and the dispensing cylinder 44c are each preferably provided with a plurality of openings extending through the sidewalls thereof, similar to the embodiment of FIGS. 3–7, to facilitate the flow of gas uniformly into and throughout the combustion chamber of the incinerator.

In order to incinerate the plastic waste, the cover of the incinerator is opened, the plastic waste is put into the incinerator 1c through the inlet and then the cover is closed, fuel is burned by the burner 45c and then the combustion gas of the fuel enters through the flue into the incinerator to raise the temperature of the incinerator.

When the temperature of the incinerator is raised to the predetermined temperature so that the plastic waste selfburns, the combustion of the fuel by the burner 45c is stopped and the oxidizing gas (that is, the mixture of air and exhaust gas from the incinerator) is fed into the incinerator from the burner 45c.

The combustion gas of the plastic waste is exhausted from a chamber d formed in the upper part of the incinerator by flowing through pipe 44c into a chamber e formed between the bottom of the incinerator and the grating, which exhaust gas then flows out the outlet 48c.

When the exhaust gas contains unburned components, it is burned by an auxiliary burner which can be attached to fitting 103. Most of the metallic components contained in the plastic waste are retained in the ashes remaining under the grating of the incinerator and are collected from an outlet 50c for ashes.

The embodiments of the invention in which an exclusive property or privilege is claimed are defined as follows:

1. An apparatus for incinerating solid plastic waste, comprising:
   1. an incinerator having inlet means for an oxidizing gaseous mixture, an outlet for exhaust gas and temperature sensing means for sensing the temperature within the incinerator, said incinerator also having an inlet for permitting solid plastic waste to be deposited therein,
   2. first detrimental components removing means connected to said outlet for exhaust gas and comprising
      a. a jet scrubber for sucking, cooling and washing said exhaust gas by a circulating liquid,
      b. an absorbing tower for absorbing hydrogen chloride contained in the exhaust gas cleaned by said jet scrubber,
      c. a reservoir tank for storing therein the circulating liquid for said jet scrubber and said absorbing tower, said reservoir tank being connected between said jet scrubber and said tower for permitting said exhaust gas to pass from said jet scrubber through the reservoir tank into said absorbing tower,
   d. means for introducing said circulating liquid into said jet scrubber and,
   e. means for cooling said circulating liquid and introducing it into said absorbing tower,
 3. second detrimental components removing means connected for receiving treated exhaust gas from said first detrimental components removing means and comprising a circulating liquid pump and an absorbing tower,
 4. an exhaust gas duct for connecting said incinerator to said first detrimental components removing means, and a further exhaust gas duct for connecting said first detrimental components removing means to said second detrimental components removing means,
 5. exhaust gas duct means connected to said second detrimental components removing means for discharging the exhaust gas, and
 6. control means responsive to said temperature sensing means and connected to both said inlet means and said exhaust gas duct means for supplying controlled quantities of exhaust gas and air to said incinerator to maintain the temperature within said incinerator to a maximum of about 800°C, said exhaust gas and air comprising an oxidizing gaseous mixture for controlling burning within the incinerator.

2. An apparatus as set forth in claim 1, wherein said first detrimental components removing means further includes a vacuum evaporator, said reservoir tank and said vacuum evaporator being connected by a pipe having a feed pump therein so that the circulating liquid in said reservoir tank can be fed into said vacuum evaporator and the hydrogen chloride in the circulating liquid can be evaporated in said evaporator.

3. An apparatus as set forth in claim 1, wherein said incinerator further includes a housing defining therein an incineration compartment, a gas burner communicating with said compartment and having a flue connected to said inlet means, an outlet in said housing for ashes, and a grating of frustoconical shape positioned within said compartment for supporting therein the solid plastic waste, said grating being open at the bottom thereof to the upper end of the flue of said gas burner as provided at the center of said incinerator, said grating being fixed to the inner periphery of said housing at the top end thereof.

4. An apparatus as set forth in claim 1, wherein said incinerator further comprises a housing defining therein an incinerator compartment, a gas burner communicating with said compartment, an outlet for ashes in said housing, a grating mounted on the housing and which has a number of openings and divides the incinerator compartment vertically into upper and lower portions, gas dispersing members engaging with communication holes in fixing members fixed on the grating, said dispersing members projecting upwardly from the grating and being closed at the upper end and having a plurality of holes opening through the side surfaces thereof, and partition walls dividing the incinerator compartment horizontally into three chambers so as to allow a combustion gas to pass through all the chambers.

5. An apparatus as set forth in claim 4, wherein said three chambers includes an inlet chamber in communication with said inlet means, an outlet chamber in communication with said gas exhaust outlet, and an intermediate chamber disposed between said inlet and outlet chambers, said inlet means communicating with the lower part of said inlet chamber below said grating and said exhaust gas outlet communicating with the upper part of said outlet chamber, the partition wall between said inlet chamber and said intermediate chamber allowing communication only between the upper parts of said inlet and intermediate chambers at a location above said grating, and the partition wall located between said intermediate chamber and said outlet chamber allowing communication only between the lower parts of said intermediate and outlet chambers at a location below said grating.

6. An apparatus as set forth in claim 5, wherein said incinerator housing comprises a substantially vertically extending cylinder, wherein the partition wall located directly between said inlet and outlet chambers extends the full height of the compartment and totally prevents direct communication therebetween, and wherein said partition walls are disposed within said cylinder and spaced at angles of approximately 120° from one another for dividing said cylinder into said three chambers.

7. An apparatus as set forth in claim 1, further including a blower having a gas inlet, an air supply tube having a damper for controlling the flow rate therethrough, said air supply tube and said exhaust gas duct means being connected to the inlet of said blower, and a duct connected to the outlet of said blower for discharging an outlet mixture of the exhaust gas and air into the atmosphere, said outlet duct having a branch duct connected to said incinerator inlet means for feeding said mixture into said incinerator.

8. An apparatus as set forth in claim 3, wherein the incinerator includes a dispersing tube mounted on the bottom end of the grating and extending upwardly therefrom, the lower end of said dispersing tube communicating with said flue, and the dispersing tube being closed at the upper end thereof and having a plurality of openings extending through the peripheral sidewall thereof.

9. An apparatus according to claim 8, wherein the incinerator compartment is divided by said grating into upper and lower chambers disposed respectively above and below the grating, said outlet for exhaust gas communicating with said lower chamber, and a further dispersion member providing communication between said upper and lower chambers and projecting upwardly into said upper chamber.

* * * * *

UNITED STATES PATENT AND TRADEMARK OFFICE
CERTIFICATE OF CORRECTION

PATENT NO. : 3 927 986
DATED : 12-23-75
INVENTOR(S) : Ishikawa, Toshikatsu; Endo, Tei; Masuyama, Toshio; Uruma, Fumio; Morishita, Masutaka; Kuki, Takeshi.

It is certified that error appears in the above-identified patent and that said Letters Patent are hereby corrected as shown below:

Column 8, line 39; change "a duct" to
---an outlet duct---.

line 41; change "an outlet mixture" to
---a mixture---.

Signed and Sealed this twenty-seventh Day of April 1976

[SEAL]

Attest:

RUTH C. MASON
*Attesting Officer*

C. MARSHALL DANN
*Commissioner of Patents and Trademarks*